Jan. 1, 1935.  A. BEZNER  1,986,708
DECORTICATING DEVICE FOR TIMBER
Filed Nov. 26, 1932   2 Sheets-Sheet 1
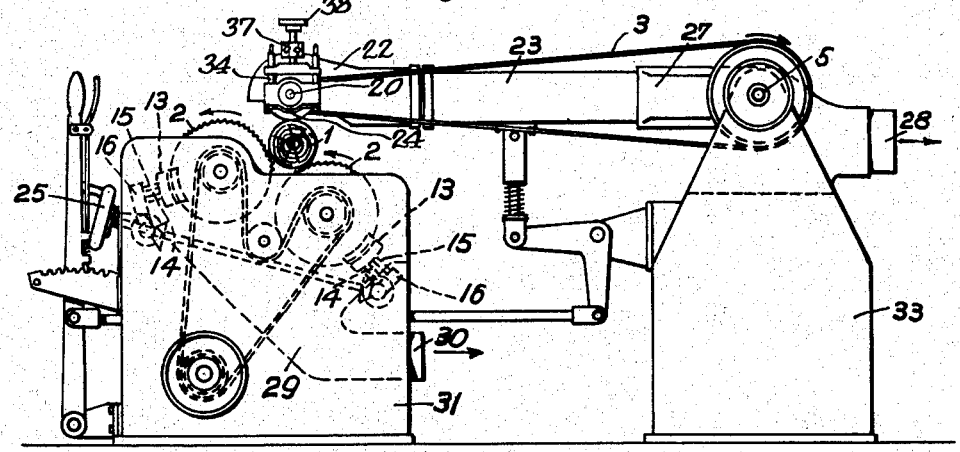
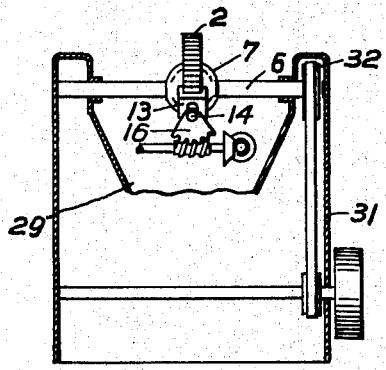
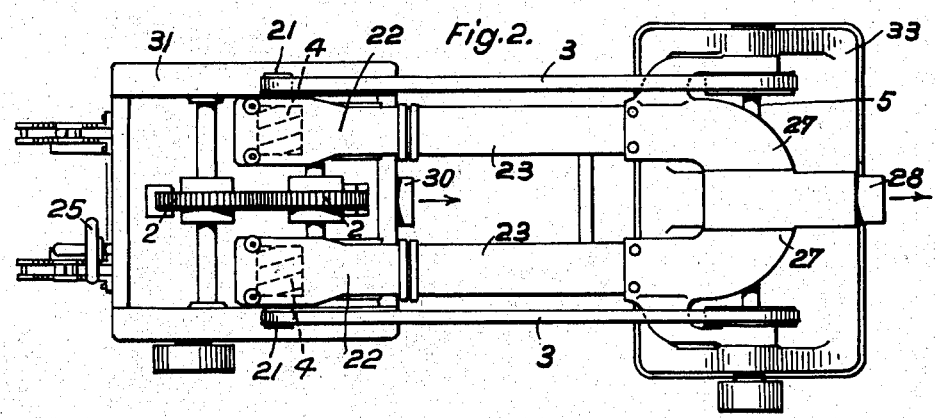
Inventor:
Albert Bezner
By William C. Linton
Atty.

Jan. 1, 1935.  A. BEZNER  1,986,708

DECORTICATING DEVICE FOR TIMBER

Filed Nov. 26, 1932    2 Sheets-Sheet 2

Inventor:
Albert Bezner
By William C. Linton
Atty.

Patented Jan. 1, 1935

1,986,708

UNITED STATES PATENT OFFICE 1,986,708

DECORTICATING DEVICE FOR TIMBER

Albert Bezner, Ravensburg, Germany

Application November 26, 1932, Serial No. 644,536

9 Claims. (Cl. 144—208)

This invention relates to a rossing, decorticating or debarking machine for round timber, tree logs, trunks of masts and the like, and particularly to that class of machines, in which the timber is turned during the debarking process by means of rotatable tappet wheels and, by placing the tappet wheels in an angular position, simultaneously moved forward relative to the barking tool, so that the timber can be decorticated by being turned only once, as is described and claimed in my application, Serial No. 644,535, filed November 16, 1932.

According to the invention, the timber is decorticated by means of a cutting tool such as a cylindrical cutter with helical cutting edge and carried by a supporting member which can be swung up and down about a shaft disposed parallel to the longitudinal axis of the timber, as is described and claimed in my application, Serial No. 497,549, filed November 22, 1930, now Patent No. 1,921,904 issued August 8, 1933. The cutting action of the tool relative to the timber is regulated by adjustable guard means which are rectilinearly adjustably disposed on the oscillatory or swingable member, on both sides of the tool, and which can be brought into engagement with the timber, the adjusting means comprising curved or arcuate guard members which are concentric with the cylindrical cutter tool and are preferably interchangeable in order to adapt them to the reduction in cutting diameter incident to regrinding of the cutter.

The swinging supporting member carrying the decorticating tool is preferably constructed in the form of a hollow arm which can be swung pivotally and which serves also for drawing off the shavings.

The tappet wheels on which the timber to be decorticated is positioned are disposed on their shafts in such a way that they are orientable about their axes and can be adjusted to the varying diameters of the timber to be shaved.

Figure 4:
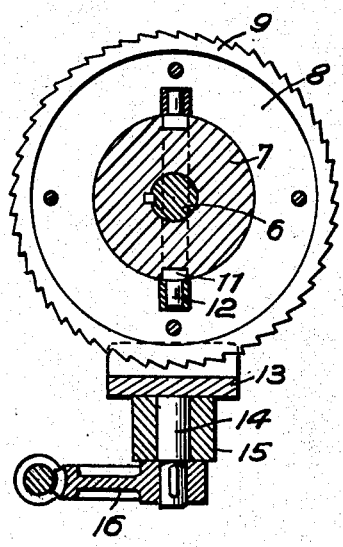
Figure 5:
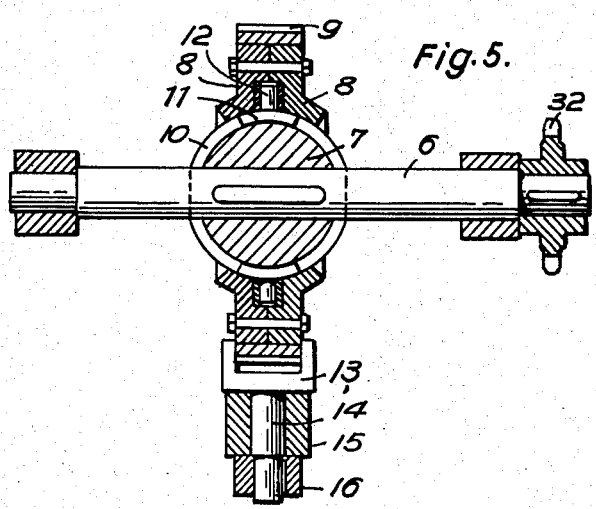
Figure 6:
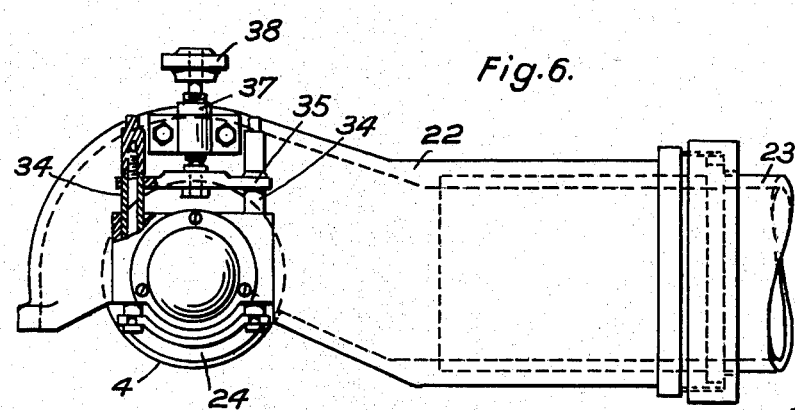
Figure 7:
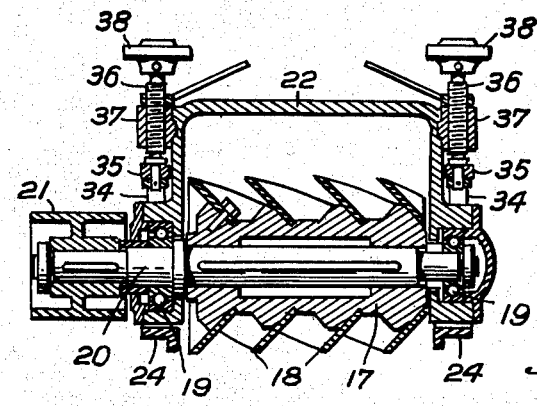
Figure 8:
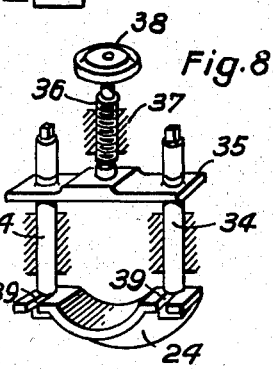

By way of example, one form of the invention is illustrated in the accompanying drawings, in which Figure 1 is a side view of a decorticating machine according to the invention; Fig. 2, a top view thereof; Fig. 3, a front view of the tappet wheel bracket, with a part thereof broken away; Figs. 4 and 5 are, respectively, a cross section and a longitudinal section of the tappet wheel; Figs. 6 and 7 are, respectively, a longitudinal section and cross section of the swinging member carrying the decorticating tool and of the adjusting device for the tool; and Fig. 8 is a perspective view of the adjusting device for the decorticating tool.

Referring to the drawings, the log or mast 1 to be decorticated rests on the two driven tappet wheels 2 which are swivelably mounted and turn the mast 1 during the debarking process and move it forward in the axial direction when turned around their axes in the same direction out of the vertical plane. The mast 1 is worked by the helical cutter 4 rotatably disposed on the free end of the tubular swingable arms 22, 23 and driven, for instance, by the belt 3. In Fig. 2, two arms 22, 23 are shown which are pivotally suspended from the frame or bracket 33 so as to swing about the shaft 5 which extends parallel to the longitudinal axis of the mast 1, each of the two swingable arms carrying at its free end a helical cutter 4. It is of course possible to employ also swinging supporting structures having one arm or more than two arms.

As shown especially in Fig. 7, the helical cutter 4 consists of the body member 17 firmly positioned on the shaft 20 guided in the two bearings 19 and driven, for example, by the pulley 21, and also is provided with a sheet metal band 18 helically attached to the member 17. In Fig. 7, two steel bands 18 are wound in double thread on the body 17, though it is possible also to provide one or several steel bands in one or multiple threads. The circumference of the body member 17 is correspondingly shaped to receive and secure the helical steel bands 18 and provided with fastening surfaces therefor, the bands 18 being preferably exchangeably secured to the body by means of screws. At its outer border the steel band 18 is made into a cutting edge. The band 18 helically wound around the body member 17 may be made also from sheet iron having a cutting edge of high-grade steel welded to it. As shown particularly in Fig. 7, the helical cutter is disposed at an angle of less than 90° relative to the longitudinal axis of the body member.

The cutter shaft 20 is carried by the light metal casing 22 which can be rotated, but not longitudinally displaced, on the swingable supporting steel tube 23. To the casing 22, at both ends of the helical cutter, vertically and rectilinearly adjustable guard members 24 are attached which comprise curved or arcuate members concentrically and symmetrically disposed relative to the helical cutter, as shown in Figs. 6 to 8. Each curved member is preferably interchangeably carried by two vertically adjustable rods 34 laterally guided on the casing 22 and connected by a cross piece 35 which can be moved up and down by the spindle 36 adapted to be screwed into the part 37 having female thread by suitable means, such as the hand wheel 38. The threaded part 37 is secured to casing 22 by any suitable means. Owing to the rectilinear adjustment of the curved members 24 which come into engagement with the timber to be decorticated and serve as feelers or guards for the cutting depth, the depth down to which the blades of the decorticating tool penetrate the mast 1 may be regulated and fine adjustment of the feelers effected.

Since the blades of the cylindrical cutters, on account of their spiral form, cannot be advanced during regrinding, the diameter of the cutting circle of the cutter will be altered according to the wear of the blades. On the other hand, as the arc of the members 24 must be concentric relative to the cutting circle and smaller to the extent of the desired cutting depth, the curved members 24 are interchangeable and, for this purpose, removably attached to the rods 34 by means of the slots 39 so as to insert a smaller curved member 24 adapted to the prevailing diameter of the cutting circle whenever necessary. Furthermore, the device described permits also concentric adjustment of the curved members 24 relative to the diameter of the cutting circle by the individual adjustment of the rods 34.

On the occasion of each larger adjustment of cutting depth the feeler members 24, which must be concentric with the cutting circle, are replaced by members having a radius about 2 to 3 millimeters smaller than that of the cutting circle of the cutter. Smaller adjustments of cutting depth can be effected by means of the spindle 36, as they involve only small deviations from the concentric position of the feeler member 24 relative to the cutting circle.

Instead of exchanging the entire structures of curved members 24, the latter may be provided also with exchangeable attachable parts.

The curved members extend under the casing 22 and engage the surface of the timber to regulate the cutting action of the cylindrical cutter 4 and its penetration into the timber.

Shavings are conveniently drawn off through the casing 22 and the swinging steel tube swinging arm 23. In the double pendulum arrangement shown, the two swinging supporting tubes 23 are connected by a curved or angle U-shaped terminal member 27 (Figs. 1 and 2) with a joint suction discharge 28.

The tappet wheel bracket 31 is also provided with a suction discharging device 30 for shavings and the like, the bracket having for this purpose, below the wheels 2, a hollow space 29 of a form causing the dropping shavings or the like to accumulate at one point whence they can be drawn off by the pipe or tube 30.

The tappet wheel bracket 31 and the bracket 33 carrying the swinging arms 22, 23 may be arranged separately or form a unit.

The tappet wheels 2 are oscillatorily or swivelably disposed on their shafts of rotation 6, and for this purpose spherical units 7, as indicated in Figs. 4 and 5, are keyed on to the shafts 6 which may be driven by a sprocket 32 or in any other suitable manner, and these spherical units carry the tappet wheels 2 consisting of two parts 8 connected by screws or the like, said parts being hollow and spherical inside and adapted to receive on their outside the rim 9. To facilitate their guidance on the spherical unit 7 the tappet wheels are fitted with sliding members 11 which are rotatably mounted on the interior of the wheel 7, 8 by means of the pins 12 and can be slidably displaced in the grooves 10 of the spherical unit 7. The tappet wheels 2 can be adjusted by the adjusting members 13 which can be rotated in the bearing 15 by the pins 14, the pins 14 and the adjusting members 13 being rotatable by means of a worm wheel segment or any suitable device, such as levers or the like. The adjusting members 13 for both wheels 2 may be coupled together to insure positive motion of the members 13 and the wheels 2. In the construction shown in the drawings, the worm wheel segments 16 for both wheels 2 are for this purpose adjustable by a common hand wheel 25, as indicated in Figs. 1 and 2, and corresponding common spindle and transmission members.

I claim:—

1. A system for debarking or scaling logs, tree trunks, masts and the like, comprising a frame, means on said frame for feeding the log longitudinally across said frame and simultaneously rotating said log about its longitudinal axis, a cutting roller having its axis of rotation substantially parallel to the axis of said log, arcuate members respectively on each end of said cutting roller on the side thereof which engages said log, means disposed substantially symmetrically on both sides of said axis of said cutting roller for carrying said arcuate members in adjustably fixed non-rotatable relation to the axis of said roller, and means for adjusting said last mentioned means in a straight line direction substantially perpendicular to the axis of said cutting roller, for regulating the cutting depth of said cutting roller relative to said log and maintaining the cutting depth approximately uniform at all circumferential points of said arcuate members as said last mentioned means is adjusted.

2. A system for debarking or scaling logs, tree trunks, masts and the like, comprising a frame, means on said frame for feeding the log longitudinally across said frame and for simultaneously rotating said log about its longitudinal axis, a cutting roller mounted with its axis of rotation substantially parallel to the axis of said log, an arcuate member at each end of said cutting roller provided with slits on both ends thereof, means on both sides of said axis of rotation of said cutting roller for engaging said slits and for carrying said arcuate members and for holding said arcuate members substantially concentrically with reference to the axis of said cutting roller, and means for adjusting said last mentioned means in a straight line direction for regulating the cutting depth of said cutting roller relative to said log and for maintaining the cutting depth substantially uniform at all circumferential points of said arcuate members when said arcuate members are displaced in parallel manner.

3. An arrangement for debarking or scaling logs, tree trunks, masts and the like, comprising a frame, means on said frame for feeding said log longitudinally across said frame and simultaneously rotating said log about its longitudinal axis, a cutting roller mounted with its axis of rotation substantially parallel to the axis of said log, an arcuate member at each end of said cutting roller, means disposed substantially symmetrically on both sides of said axis of said cutting roller for carrying said arcuate members, a spindle mounted for the simultaneous rectilinear adjustment of said means for controlling the cutting depth of said cutting roller relative to said log and for maintaining the cutting depth approximately uniform during parallel displacement of said arcuate members at all circumferential points thereof.

4. In a rossing machine for debarking logs, a frame, means on said frame for feeding said log longitudinally across said frame and simultaneously rotating said log about its longitudinal axis, a cutter head carried by said frame, a cutting roller carried by said cutter head and mounted with its axis of rotation substantially parallel to the axis of said log for engaging said log, a pair of arcuate guard members positioned at the respective ends of said cutting roller symmetrically with respect to the axis thereof on the side of said cutting roller adjacent said log for engaging said log, and adjustable means attached to said cutter head for carrying said arcuate guard members, said means being adapted to linearly adjust symmetrically with reference to the axis of said cutting roller the distance between the outer edge of said arcuate guard member which engages said log and the cutting circle of said cutting roller.

5. In a rossing machine for debarking logs, a frame, means on said frame for feeding said log longitudinally across said frame and simultaneously rotating said log about its longitudinal axis, a cutter head carried by said frame, a cutting roller carried by said cutter head and mounted with its axis of rotation substantially parallel to the axis of said log for engaging said log, a pair of arcuate guard members positioned at the respective ends of said cutting roller symmetrically with respect to the axis thereof on the side of said cutting roller adjacent said log for engaging said log, a pair of supporting elements for each of said arcuate members positioned on opposite sides of said cutting roller and substantially perpendicularly and symmetrically with reference to the axis thereof and carrying said arcuate members, and individual adjusting means for each of said pair of supporting elements, each of said adjusting means being carried by said cutter head and symmetrically engaging the elements of its corresponding pair of supporting elements and being adapted to controllably adjust the position of said arcuate members relative to said cutter head symmetrically with referense to the axis of said cutting roller.

6. In a rossing machine for debarking logs, a frame, means on said frame for feeding said log longitudinally across said frame and simultaneously rotating said log about its longitudinal axis, a cutter head carried by said frame, a cutting roller carried by said cutter head and mounted with its axis of rotation substantially parallel to the axis of said log for engaging said log, a pair of arcuate guard members positioned at the respective ends of said cutting roller symmetrically with respect to the axis thereof on the side of said cutting roller adjacent said log for engaging said log, said arcuate members being terminally slotted at both ends, a pair of supporting elements for each of said arcuate members respectively engaging the slots in said arcuate members and being positioned on opposite sides of said cutting roller and substantially perpendicularly and symmetrically with reference to the axis thereof, and individual adjusting means for each of said pair of supporting elements, each of said adjusting means being carried by said cutter head and carrying the elements of its corresponding pair of supporting elements symmetrically with reference to the axis of said cutting roller, whereby said adjusting means controllably vary the position of said arcuate members with reference to said cutting roller symmetrically with reference to the axis thereof.

7. In a rossing machine for debarking logs, a frame, means on said frame for feeding said log longitudinally across said frame and simultaneously rotating said log about its longitudinal axis, a cutter head carried by said frame, a cutting roller carried by said cutter head and mounted with its axis of rotation substantially parallel to the axis of said log for engaging said log, a pair of arcuate guard members positioned at the respective ends of said cutting roller symmetrically with respect to the axis thereof on the side of said cutting roller adjacent said log for engaging said log, a pair of threaded bolts for each of said arcuate members positioned on opposite sides of said cutting roller and substantially perpendicularly and symmetrically with reference to the axis thereof and carrying said arcuate members, a yoke member for each of said pairs of bolts, said yoke member being provided with tapped bores for respectively engaging the threads on said bolts, and screw adjusting means carried by said cutter head and engaging said yoke member, whereby adjustment of said screw adjusting means varies the position of said arcuate members with reference to said cutting roller symmetrically in relation to the axis thereof.

8. In a rossing machine for debarking logs, a frame, means on said frame for feeding said log longitudinally across said frame and simultaneously rotating said log about its longitudinal axis, a cutter head carried by said frame, a cutting roller carried by said cutter head and mounted with its axis of rotation substantially parallel to the axis of said log for engaging said log, a pair of arcuate guard members positioned at the respective ends of said cutting roller symmetrically with respect to the axis thereof on the side of said cutting roller adjacent said log for engaging said log, said arcuate members being terminally slotted at both ends, a pair of threaded bolts for each of said arcuate members respectively engaging the slots in said arcuate members and being positioned on opposite sides of said cutting roller and substantially perpendicularly and symmetrically with reference to the axis thereof, a yoke member for each of said pair of bolts, said yoke member being provided with tapped bores for respectively engaging the threads on said bolts, and screw adjusting means carried by said cutter head and engaging said yoke member, whereby adjustment of said screw adjusting means varies the position of said arcuate members with reference to said cutting roller symmetrically in relation to the axis thereof.

9. In a rossing machine for debarking or scaling logs, tree-trunks, masts and the like, a frame, means on said frame for feeding said log longitudinally across said frame and for simultaneously rotating said log about its longitudinal axis, a cutting roller mounted with its axis of rotation substantially parallel to the axis of said log, arcuate members of arc less than a semi-circle respectively on each end of said cutting roller on the side thereof which engages said log, a plurality of similar means disposed substantially symmetrically on both sides of said axis of said cutting roller for carrying said arcuate members, and common means for adjusting said last-named means in a straight line direction substantially perpendicular to the axis of said cutting roller for regulating the cutting depth of said cutting roller relative to said log and maintaining the cutting depth approximately uniform at all circumferential points of said arcuate members as said common means is adjusted.

ALBERT BEZNER.